(12) United States Patent
Ho et al.

(10) Patent No.: US 10,411,778 B1
(45) Date of Patent: Sep. 10, 2019

(54) ANTENNA DIVERSITY FOR BEACON BROADCASTING IN DIRECTIONAL WIRELESS NETWORK

(71) Applicant: Apple Inc., Cupertino, CA (US)

(72) Inventors: Keangpo Ricky Ho, San Jose, CA (US); Su Khiong Yong, Palo Alto, CA (US); Yigal Eliaspur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/100,606

(22) Filed: Aug. 10, 2018

Related U.S. Application Data

(60) Provisional application No. 62/636,478, filed on Feb. 28, 2018.

(51) Int. Cl.
*H04B 7/06* (2006.01)
*H04W 76/10* (2018.01)

(52) U.S. Cl.
CPC ......... *H04B 7/0617* (2013.01); *H04B 7/0623* (2013.01); *H04B 7/0632* (2013.01); *H04B 7/0682* (2013.01); *H04B 7/0695* (2013.01); *H04W 76/10* (2018.02)

(58) Field of Classification Search
CPC .......... H04B 7/06; H04B 7/0604; H04B 7/04; H04B 7/0491
USPC ....................................................... 375/299
See application file for complete search history.

(56) References Cited

U.S. PATENT DOCUMENTS

| | | | |
|---|---|---|---|
| 8,165,534 B2 | 4/2012 | Meier | |
| 2007/0184846 A1* | 8/2007 | Horton, Jr. | G08G 5/0013 455/456.1 |
| 2009/0295635 A1* | 12/2009 | Smoot | H01Q 1/28 342/359 |
| 2011/0064033 A1 | 3/2011 | Gong | |
| 2011/0205969 A1 | 8/2011 | Ahmad | |
| 2016/0255471 A1 | 9/2016 | Marri Sridhar | |
| 2017/0026098 A1* | 1/2017 | Maltsev | H04B 7/0491 |
| 2017/0111806 A1 | 4/2017 | Roh | |
| 2017/0126303 A1 | 5/2017 | Jo | |
| 2017/0134145 A1 | 5/2017 | Xin | |
| 2018/0026695 A1 | 1/2018 | Johnsson | |

FOREIGN PATENT DOCUMENTS

WO   WO 2017/156315 A1   9/2017

OTHER PUBLICATIONS

International Search Report and Written Opinion, Application No. PCT/US2018/066298, dated Mar. 4, 2019, 14 pages.

\* cited by examiner

*Primary Examiner* — Kevin Kim
(74) *Attorney, Agent, or Firm* — Meyertons Hood Kivlin Kowert and Goetzel PC; Jeffrey C. Hood

(57) ABSTRACT

Antenna diversity for beacons. An access point device may include multiple antenna arrays. A series of beacons may be transmitted using each of the antenna arrays in sequence. The beacons may include configuration information usable by wireless devices to determine when to respond to the beacons. The access point may receive responses during a series of response periods, using each of the antenna arrays.

20 Claims, 8 Drawing Sheets

ANTENNA DIVERSITY FOR BEACON BROADCASTING IN DIRECTIONAL WIRELESS NETWORK

PRIORITY CLAIM

This application claims priority to U.S. provisional patent application Ser. No. 62/636,478, entitled "Antenna Diversity for Beacon Broadcasting in Directional Wireless Network," filed Feb. 28, 2018, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

Embodiments described herein are related to the field of wireless communication, and more particularly to a system, apparatus, and method for broadcasting beacons and responding to beacons in directional wireless networks.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi, and WiGig), IEEE 802.16 (WiMAX), Bluetooth, and others.

With the increasing number of wireless communication technologies in existence, it has become more common for wireless devices to include multiple antennas and/or multiple radios to implement various wireless communication technologies. Some standards (e.g., recent versions of IEEE 802.11ad and 802.11ay) use directional wireless technique to improve the system performance. Improvements in the field of transmitting and receiving beacons using antenna arrays in directional wireless networks are desired.

SUMMARY

Embodiments are presented herein of, inter alia, a method for an access point to transmit beacons specifying response periods corresponding to the antenna array used to transmit the beacon. Further, embodiments are presented herein of, inter alia, a method for a wireless station (STA) device to receive beacons from an access point, determine a response period, and respond to the beacon. Embodiments are presented herein of, inter alia, devices and apparatuses configured to implement the methods.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

DETAILED DESCRIPTION

Terms

Figure 1:
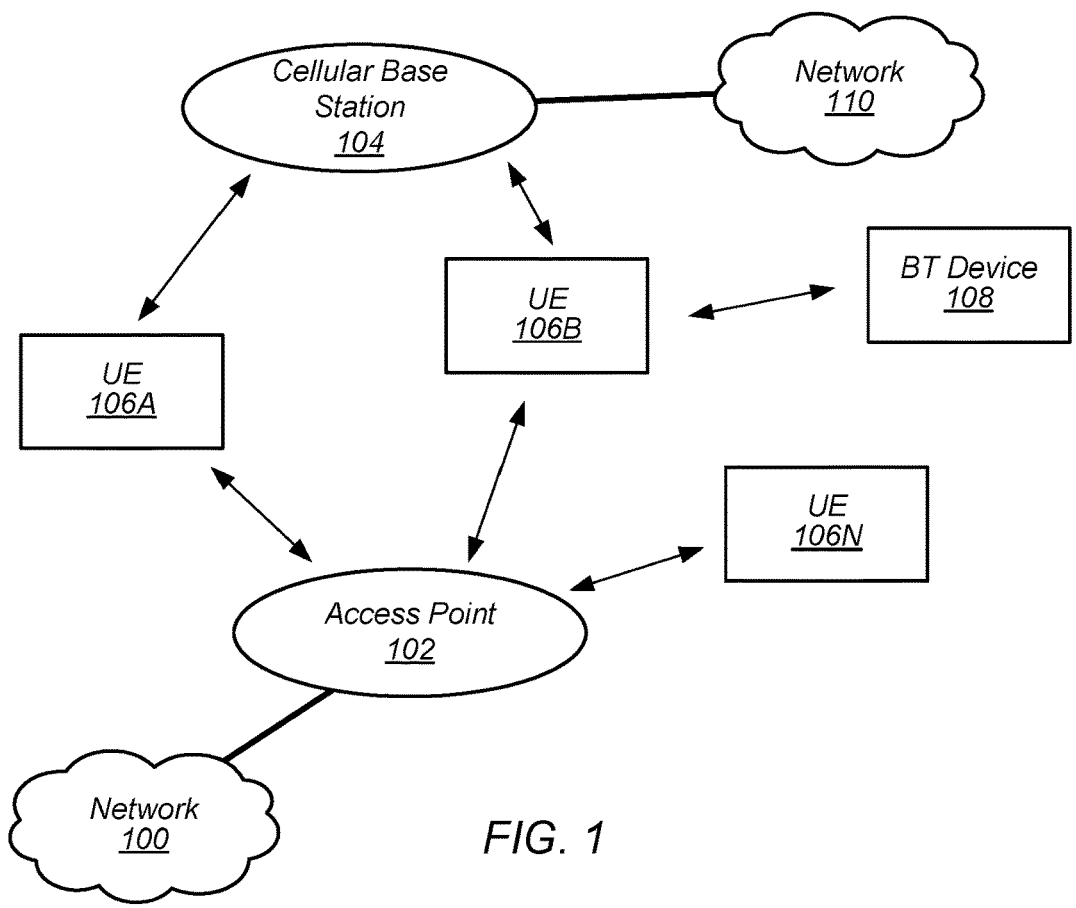
FIGS. 1 and 2 illustrate exemplary wireless communication systems involving a wireless device performing wireless communication according to multiple wireless communication technologies.

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

IEEE 802.11—refers to technology based on IEEE 802.11 wireless standards such as 802.11a, 802.11.b, 802.11g, 802.11n, 802.11-2012, 802.11ac, 802.11ad, 802.11-2016, 802.11ax, 802.11ay, and/or other IEEE 802.11 standards. IEEE 802.11 technology may also be referred to as "Wi-Fi" or "wireless local area network (WLAN)" technology.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
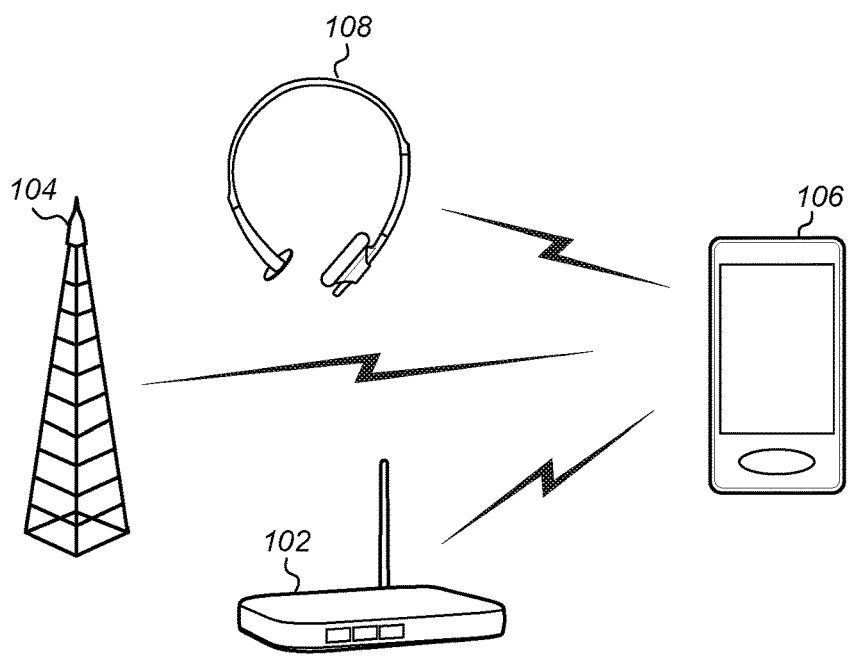

FIGS. 1 and 2—Exemplary Communication Systems

FIGS. 1 and 2 illustrate an exemplary (and simplified) wireless communication system. It is noted that the system of FIGS. 1 and 2 is merely one example of a possible system, and embodiments may be implemented in any of various other systems, as desired.

As shown, the exemplary wireless communication system includes an access point (AP) 102 which communicates over a transmission medium with one or more user devices 106A, 106B, etc., through 106N. Each of the user devices may be referred to herein as a "user equipment" (UE) or "station" (STA). Thus, the user devices are referred to as UEs, UE devices, or STAs.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using WLAN, e.g., Wi-Fi, including any of various versions of IEEE 802.11 (e.g., a, b, g, n, ac, ad, ay, wake-up radio (WUR), etc.).

In some embodiments, the WLAN may be an ad-hoc or ad-hoc like network, e.g., using Personal Basic Service Set (PBSS) architecture, e.g., as defined in IEEE 802.11 ad and 802.11 ay. The PBSS may offer advantages for ad-hoc like peer-to-peer networking. In such cases, the role of access point 102 may be performed by a UE device (e.g., one of the UEs 106) acting as a PBSS Control Point (PCP). For convenience, the terms "access point" and "AP/PCP" may be used herein to include an access point or PCP.

One or more of the UEs 106 (e.g., UEs 106A, 106B) may also or alternatively be configured to communicate with a base station 104. The base station 104 may be a base transceiver station (BTS) or cell site (a "cellular base station"), and may include hardware that enables wireless communication with UEs 106 according to one or more cellular communication protocols. Such a UE 106 and the cellular base station 104 may communicate using any of various cellular communication technologies such as GSM, UMTS (WCDMA, TDS-CDMA), LTE, LTE-Advanced (LTE-A), 3GPP2 CDMA2000 (e.g., 1×RTT, 1×EV-DO, HRPD, eHRPD), 5G/NR, etc.

As shown, the cellular base station may be equipped to communicate with a network 110 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 110. The cellular base station 104 may provide UEs 106 with various telecommunication capabilities, such as voice, SMS, and/or data services.

One or more of the UEs 106 (e.g., UE 106B) may also or alternatively be configured to communicate with a Bluetooth (BT) device 108 via a Bluetooth link. The Bluetooth device 108 may be any of a variety of types of Bluetooth devices, including a headset, a car speaker system, mouse, keyboard, or other input device, another wireless device, etc.

Thus, at least in some instances a UE 106 may be capable of communicating using multiple wireless communication technologies, such as exemplified by UEs 106A and 106B illustrated in FIG. 1. In addition, or as alternatives to WLAN/Wi-Fi, Bluetooth, and various cellular communication standards, a UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication technology, as desired. Note additionally that it may also be possible for a UE to only be capable of communicating using a single wireless communication technology, if desired.

FIG. 2 illustrates a UE device 106 (e.g., UE device 106B illustrated in FIG. 1) in communication with a Wi-Fi access point (e.g., a PCP) 102, cellular base station 104, and Bluetooth device 108 (e.g., a wireless headset as shown, although other types of Bluetooth devices are envisioned). Thus, the UE 106 may be configured to communicate using any of multiple wireless communication protocols. The UE 106 may be any of various possible devices with wireless communication capability, such as a mobile phone, a handheld device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include multiple antennas for communicating using one or more wireless communication protocols or technologies. In one embodiment, the UE 106 might be configured to communicate using either of multiple wireless communication technologies using a single shared radio. The shared radio may couple to a single antenna, or may couple to multiple antennas (e.g., for multiple-in-multiple-out (MIMO)) for performing wireless communications. Multiple antennas may be used for single or multiple spatial streams (e.g., directional streams or beams). In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies.

In some embodiments, the UE 106 may include separate transmit and/or receive chains for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM or 5G NR), and separate radios for communicating using each of Wi-Fi and Bluetooth. Other configurations are also possible.

In some instances, couplings between some or all antennas and radios of a UE 106 may be dynamically configurable. For example, antenna switching logic may be provided in a UE 106 to dynamically determine and configure (or reconfigure) which antenna(s) of the UE will be used for wireless communication by which radio(s). One or more antennas and radios of a UE 106 may alternatively or additionally be permanently (fixedly) coupled to each other, if desired.

The BS 104 may be configured to communicate according to MIMO techniques. For example, the BS 104 may use multiple antennas to communicate with UE 106 using one or more transmit chains and/or receiver chains. Technical standards may describe a variety of modes for communication between these devices, e.g., LTE or 5G NR standards may describe various transmission modes (TM) which may specify different transmission schemes for physical downlink shared channel (PDSCH) messages. For example, TM1 may utilize only a single antenna, while other (e.g., higher numbered) modes may utilize additional antennas. One or more physical downlink control channel (PDCCH) messages may include control information. The control info may include an allocated rank (e.g., rank identifier or RI) and modulation and coding scheme (MCS). The nature of the control information may differ between different transmission modes. For example, according to TM3 and TM4, a pre-coding matrix indicator (PMI), may be included, but according to TM9, PMI may not be included.

Figure 3:
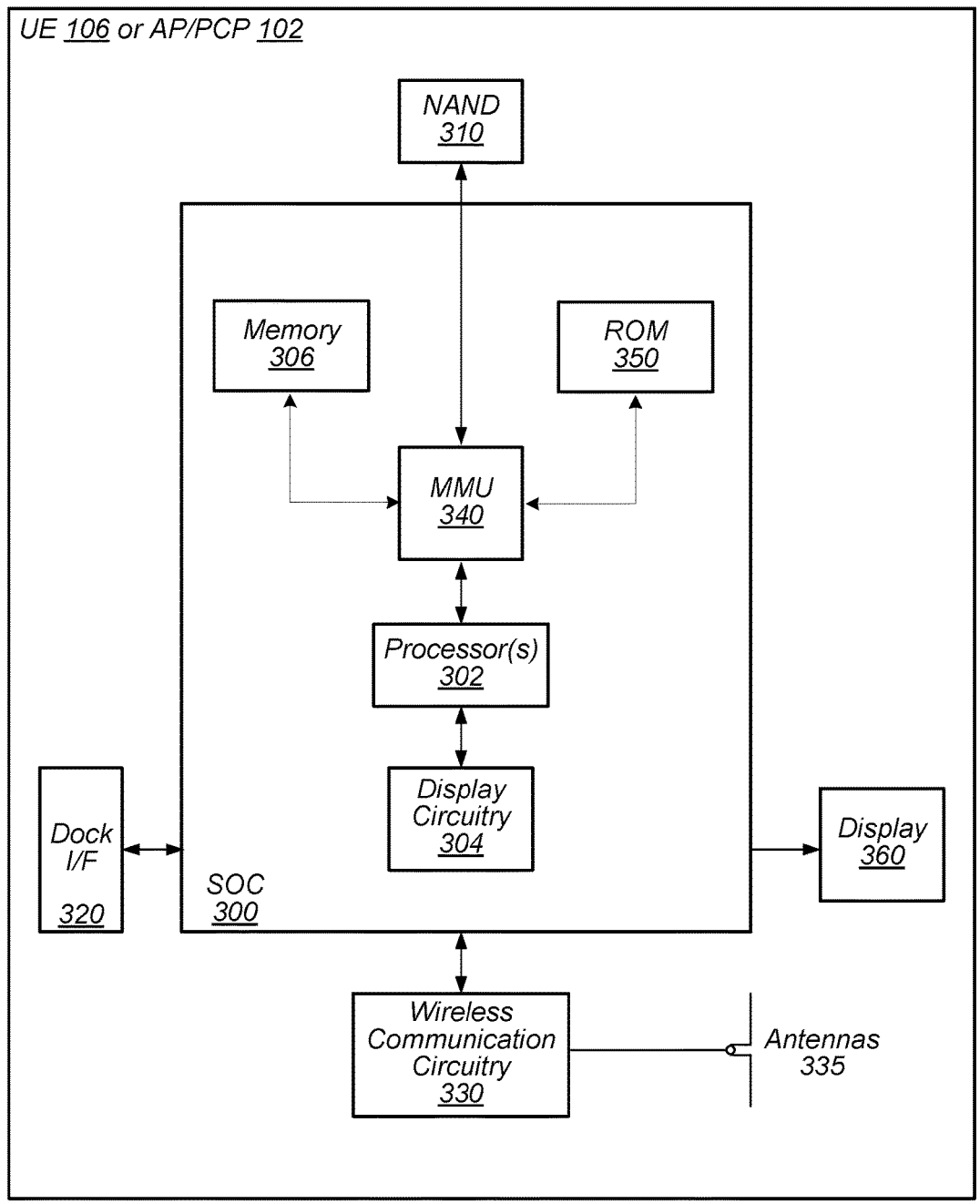
FIG. 3 is a block diagram illustrating an exemplary wireless device.

FIG. 3—Exemplary Block Diagram of a Wireless Device

FIG. 3 illustrates an exemplary block diagram of a UE 106 and/or an AP 102. As shown, the UE 106/AP 102 may include a system on chip (SOC) 300, which may include portions for various purposes. For example, as shown, the SOC 300 may include processor(s) 302 which may execute program instructions for the UE 106/AP 102 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/AP 102. For example, the UE 106/AP 102 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, 5G NR, CDMA2000, Bluetooth, Wi-Fi, GPS, etc.).

As noted above, the UE 106/AP 102 may be configured to communicate wirelessly using multiple wireless communication technologies. As further noted above, in such instances, the wireless communication circuitry (radio(s)) 330 may include radio components which are shared between multiple wireless communication standards and/or radio components which are configured exclusively for use according to a single wireless communication standard. As shown, the UE 106/AP 102 may include multiple antennas 335 (e.g., for implementing different wireless communication technologies, for MIMO, for flexibility, etc., among various possibilities) for performing wireless communication with other devices (e.g., including APs, UEs/STAs, base stations, etc.).

The UE 106/AP 102 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone, speakers, one or more cameras, one or more buttons, and/or any of various other elements capable of providing information to a user and/or receiving/interpreting user input.

The UE 106/AP 102 may include hardware and software components for implementing the features described herein. The processor 302 of the UE 106/AP 102 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106/AP 102, in conjunction with one or more of the other components 300, 304, 306, 310, 320, 330, 335, 340, 350, 360 may be configured to implement part or all of the features described herein.

Figure 4:
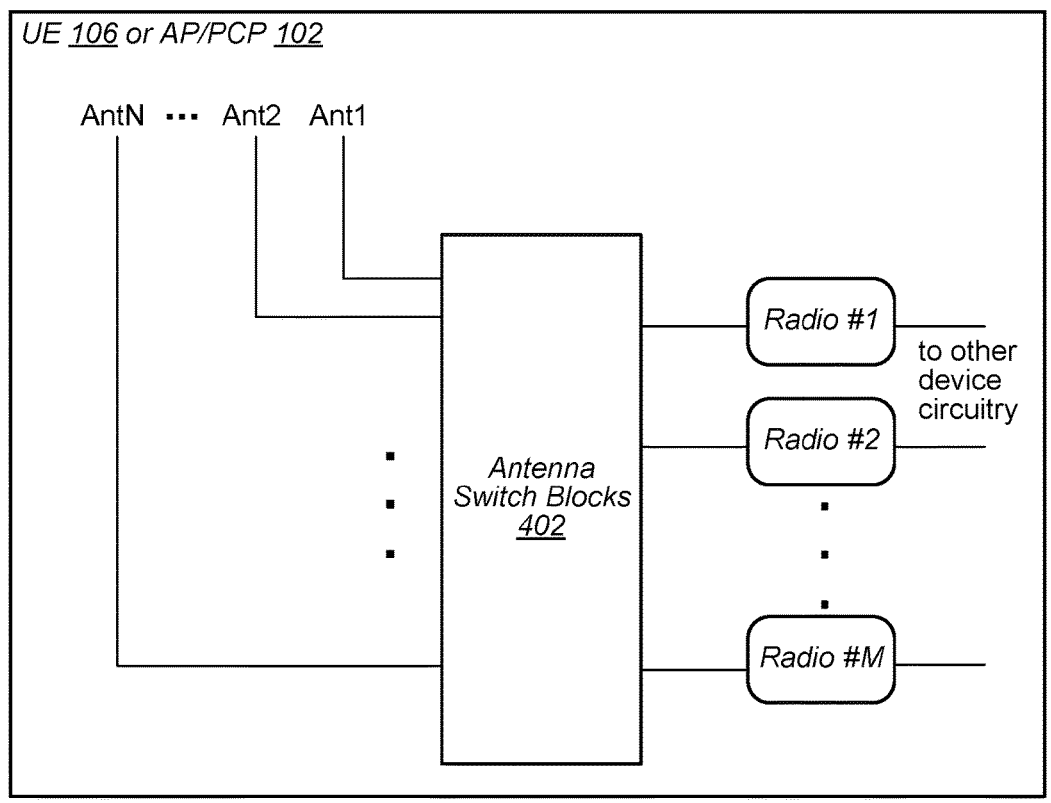
FIG. 4 is a block diagram illustrating an exemplary RF portion of a wireless device, according to some embodiments.

FIG. 4—Exemplary Block Diagram of an RF Portion of a Wireless Device

FIG. 4 is a block diagram illustrating an exemplary RF portion of a wireless device (such as one of the STA/UEs 106 or AP/PCP 102 illustrated in FIGS. 1-3) with a configurable antenna arrangement. It should be noted that the exemplary details illustrated in and described with respect to FIG. 4 are not intended to be limiting to the disclosure as a whole: numerous variations and alternatives to the details provided herein below with respect to FIG. 4 are possible and should be considered within the scope of the disclosure.

As shown, the wireless device may include N antennas and M radios. The N antennas may be grouped into any number of arrays; each array may have any number of antennas (e.g., the number may or may not be equal for each array). For example, an AP 102 may include 30 antennas, grouped into 4 arrays as follows: array 1: 8 antennas, array 2: 6 antennas, array 3: 9 antennas, and array 4: 7 antennas. Note that other numbers of antennas and arrays are possible. Each antenna and each radio may couple to one or more antenna switch blocks 402. The antenna switch blocks 402 may be capable of switching couplings/connections between antennas of the antenna arrays and radios of the radio arrays to provide connectivity between various radio/antenna combinations. Note that the number of antennas and radios in each of multiple arrays may be the same, or it may be different.

Any of various algorithms may be used to determine how the antenna switch block(s) 402 switches connectivity between the various possible radio/antenna/array combinations. When configured for transmission function, the antenna switch blocks 402 may split the signal to various antennas (e.g., in one or more arrays) with different amplitude and phase splitting amplitude-weight vector (AWV). When configured for receiving function, the antenna switch blocks 402 may combine the signals from various antennas (e.g., in one or more arrays) with different amplitude and phase combining AWV. Among other possible benefits, the multiple antennas (and/or antenna arrays) and the antenna switch block(s) 402 may enable the device to transmit and/or receive with control over the direction of the "beam". Thus, the wireless device may be able to communicate according to standards that include directional multi-gigabit (DMG) or enhanced directional multi-gigabit (EDMG) functionality, such as IEEE 802.11 ad and ay. The device may use a plurality of different antenna patterns (e.g., within a single array or potentially multiple antenna arrays) to transmit/receive for different directional sectors/beams. For example, an AP 102 may sweep through all sectors of a first antenna array by activating a combination of the antennas (and possibly radios) of the first array to transmit or receive for each sector, sequentially. Following the sweep of all sectors of the first antenna array, the AP 102 may perform a sweep of all sectors of a second antenna array and so forth. The sectors and arrays may be designed such that, in combination, they cover stations in all (e.g., all reachable) directions. However, antenna arrays may have a limited field of view (e.g., less than 360° or less than a solid angle of $4\pi$). For example, a planar antenna array with a ground plate may only reach stations in a hemisphere (e.g., may not be able group antennas to transmit to sectors not in that hemisphere and thus may not be able to transmit to or receive from stations not in that hemisphere) even if each antenna element in the antenna array is designed to cover more than a hemisphere. Similarly, an antenna array mounted on the middle of a circuit broad, typically with a ground plate, may also only be able to reach stations in a hemisphere.

In order to have a field-of-view of 360° (or a solid angle of $4\pi$), multiple antenna arrays pointing to different directions may be required. More generally, multiple arrays may be used to achieve a field-of-view larger than the limit of each individual antenna limit. The number of required antenna arrays may depend on the possible field-of-view of each individual antenna array. Each antenna array may have multiple antennas (e.g., multiple antenna elements), and the resulting directional control may improve the link budget of the wireless link (e.g., less energy may be required for effective transmission/reception). Sectors and antenna patterns may be designed with sets of amplitude-weight vector (AWV) to concentrate the signal (or maximize the sensitivity in receiving) to certain directions within the field-of-view of the antenna array. Note that FIG. 7 (discussed below) illustrates multiple sectors for each of three antenna arrays. In some embodiments, the beam or sector may be trained iteratively to point the antenna arrays of the AP 102 and STA 106 toward each other. In some embodiments, one device (e.g., STA 106) may try various AWV configurations of its own antenna arrays to determine the best among them to communicate with another device (e.g., AP 102).

In some embodiments, the AP 102 may have a single signal chain which may allow the reception of one signal at a time. Thus, although the signals of many antenna elements (e.g., antennas) may be combined, only one signal processing unit may process the signal. In other words, although the same signal may be split to many antenna elements in an antenna array, one and only one signal may be carried. In some embodiments, the AP 102 may have a single signal chain for multiple antenna arrays. In other words, the AP 102 may switch between different antenna arrays for transmission and reception, but may not use multiple antenna arrays at the same time.

Figure 5:
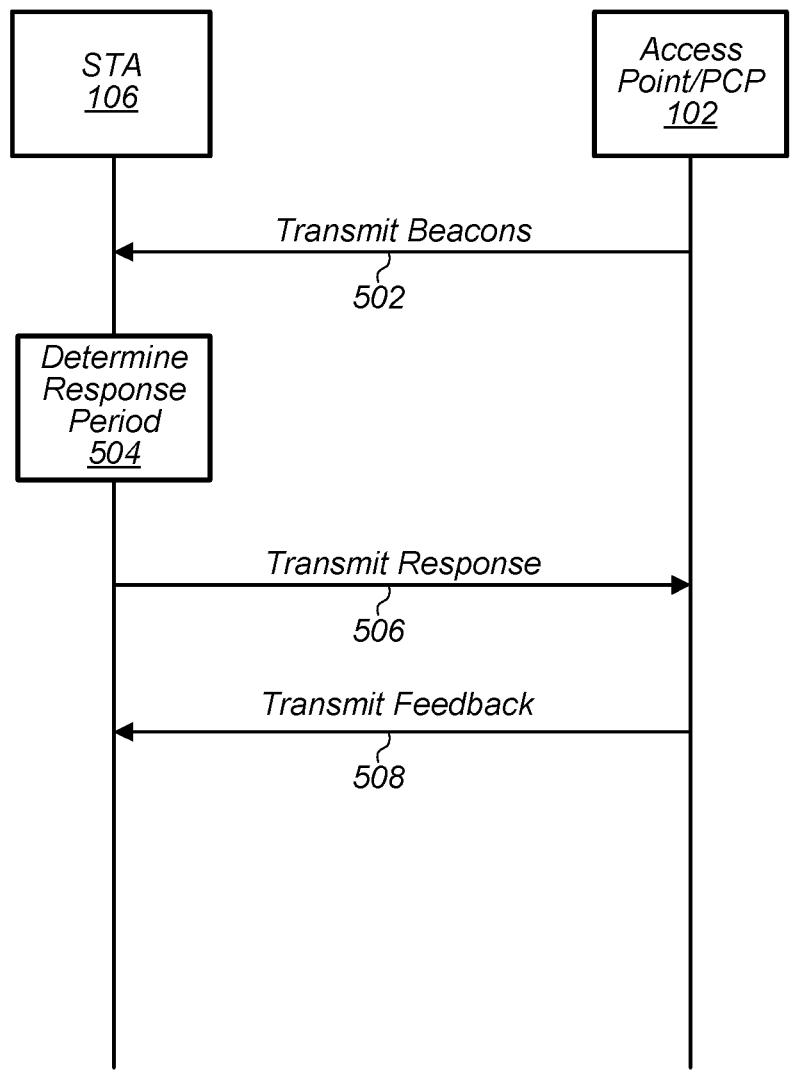
FIG. 5 is a communication flow diagram illustrating beacon transmission and response, according to some embodiments.

FIG. 5—Beacon Transmission and Response

FIG. 5 illustrates a method for transmission of one or more beacons by a first wireless device (e.g., AP or PCP 102, referred to hereinafter as "AP" for convenience). In various embodiments, some of the elements of the methods shown may be performed concurrently, in a different order than shown, may be substituted for by other method elements, or may be omitted. Additional method elements may also be performed as desired. Aspects of the method of FIG. 5 may be implemented by devices, such as a STA 106 and AP 102 illustrated and described with respect to the figures herein, among other devices, as desired.

The first wireless device (e.g., AP 102) may transmit beacons in any number of directions or sectors using one or more antenna arrays. The beacons may include various fields to, among other things, configure or describe one or more response periods. A second wireless device (e.g., a STA 106 attempting to join the network of the first device) may determine a response period based on receiving a beacon, and may transmit a response during the response period (e.g., during a selected/determined response period). The response period may be selected by the second device so that the first device is able to receive the response. In other words, the second device may determine a response period wherein the first device may be configured to receive signals using an antenna array (e.g., or potentially from a specific direction or sector) corresponding to the second device during the response period. Further, the process of beacon and response may allow both the AP 102 and STA 106 to train their respective antenna arrays for efficient communication between the two devices. In other words, the AP 102 and any STA 106 that is newly joining the network may attempt to identify what antenna array and reception/transmission beams/sectors provide the best channel characteristics for each device (e.g., for both the uplink and downlink directions. Due to channel reciprocity, a transmission beam (e.g., that offers the best channel characteristics) from the AP 102 to the STA 106 may correspond to a reception beam to be used by the AP 102 to receive from the STA 106. Thus, antenna(s) and/or antenna array(s) may be paired between the STA 106 and the AP 102.

According to some wireless standards (e.g., 802.11 ad), the AP 102 may be configured to use a plurality of antenna arrays/elements to transmit beacons, but only to use a single antenna in one antenna array (e.g., using a quasi-omni antenna pattern of that array) for reception during the response period. As a result of this configuration, STAs in some locations may receive the beacon but may not be able to respond to the beacon (e.g., or a response may not be received by the AP 102) if the antenna array used by the AP 102 to receive during the response period does not correspond to the direction (e.g., location) of the STA. Further, responses from multiple stations, if transmitted at the same time, may lead to collisions/interference. The method of FIG. 5 may ameliorate this limitation, e.g., by configuring response periods for each of multiple antenna arrays, even potentially for specific directions/sectors within each array.

The method shown in FIG. 5 may be used in conjunction with any of the computer systems or devices shown in the Figures, among other devices. As one particular example, the method may be implemented by a wireless user equipment device or station, such as a UE 106 in communication with an AP or PCP such as AP 102. As noted above, in some embodiments, both devices may be user equipment devices such as UE 106, one of which is acting as PCP. Each of the devices may include multiple antennas and/or antenna arrays. In various embodiments, some of the method elements shown may be performed concurrently, in a different order than shown, or may be omitted. Additional method elements may also be performed as desired. As shown, the method may operate as follows.

AP 102 may transmit one or more beacons (502). AP 102 may be configured to periodically transmit beacons using at least one antenna array. The beacons may be transmitted during a beacon sweep period (also called a beacon transmission interval (BTI) or beacon transmission time). A beacon (e.g., a beacon frame) may be a type of management frame in a wireless network (e.g., according to 802.11 standards) and may provide information about the network 100 (e.g., a basic service set or BSS, or peer-to-peer BSS or PBSS). Periodic transmission of beacons may serve to synchronize members of the network. Beacon transmission may broadcast common network configuration information to all stations within the network and/or attempting to join the network. During each periodic beacon sweep period, the AP 102 may broadcast beacons to all stations in range of the network by rotating through its antenna arrays and/or transmitter sectors. In other words, in some embodiments, during a single BTI, the AP 102 may broadcast beacons sequentially (e.g., one for each sector of each antenna array) until a beacon has been broadcast from each sector (e.g., and to each direction). In some embodiments, beacons may only be transmitted to a subset of sectors and/or using only a subset of antenna arrays. In some embodiments, only one beacon may be transmitted for each antenna array, for example using a quasi-omni directional beam configured to reach all directions reachable by the antenna array.

As noted above, each beacon may include various information in one or more fields transmitted with (e.g., as part of or separately from) the beacon. In particular, the beacons may include information describing the configuration of one or more response periods, e.g., according to the rotation through the antenna arrays of the AP. In some embodiments, the configuration information (e.g., included in the field(s)) may be useable by a STA 106 that receives the beacon to determine the time of a response period during which the AP 102 will receive using the same antenna array as the AP 102 used to transmit the beacon (e.g., the specific beacon). Such configuration information may be indicated in various ways (e.g., in one or more fields), as described below. Each beacon may be about 25 μs long, however the duration may be configured as desired (e.g., according to standards such as IEEE 802.11ad/ay). For example, the duration of the beacon may depend on the included fields transmitted in or with the beacon. Various forms of configuration information are described below. Any combination of these (and/or other) forms of configuration may be included.

One form of configuration information is that each beacon transmitted by the AP 102 may indicate the identity of the antenna array and/or sector/beam/antenna pattern that the AP 102 uses to transmit the beacon. In some embodiments, the directional multi-gigabit (DMG) Antenna ID subfield of the sector sweep (SSW) field transmitted in the beacon may specify the antenna ID used to transmit the beacon (e.g., a DMG beacon). This information may be useable by the STA 106 for beam training and for responding to the beacon, e.g., by enabling the STA 106 to determine a response period during which the AP 102 may receive a response from the STA 106 with an antenna array (e.g., and possibly a sector/beam/antenna pattern) corresponding to the location of the STA 106.

Another form of configuration information is that each beacon transmitted by the AP 102 may further indicate details of one or more response periods (e.g., association beamforming training (A-BFT) periods). For example, the beacon may indicate one or more A-BFT periods, each of which may consist of one or more sector sweep (SSW) slots. Each A-BFT period may correspond to a different antenna array used by the AP 102. In other words, the beacon may indicate antenna reciprocity between the beacon and a response period, thus directing the receiving STA 106 to a dedicated response period for the antenna array in which the AP 102 will use that antenna array to receive transmission(s) from STA(s) in a quasi-omni mode or best coverage pattern. The number of A-BFT periods may depend on the number of antenna arrays and/or sectors of the AP 102. The length/duration of each response/A-BFT period may be configured as desired and may vary from one response/A-BFT period to another, e.g., the duration may depend on the antenna configuration/orientation and number of sectors (which may be configurable using a codebook or AWV).

Another form of configuration information is that the number of SSW slots may be configured by the AP 102, and the number of SSW slots may be indicated in/with the beacons. For example, a higher number of slots may reduce the probability of collisions between multiple stations contending for access (e.g., by reducing the probability that two or more stations will select the same slot for contention). Various wireless standards may allow for different numbers of slots, for example 802.11 ad may allow 8 slots and 802.11 ay may allow 16 or more slots. The length of each A-BFT period may depend on the number of SSW slots, the antenna configuration/orientation of the sector, etc. Thus, knowledge of the number of slots in each A-BFT period may be useable by the STA 106 to determine the response slot time of a specific A-BFT period.

Another form of configuration information is that each beacon transmitted by the AP 102 may further indicate or signal the time of a response period (or the times of multiple response periods). This indication may be implemented in various ways. Among other possibilities, the time may be indicated based on the duration of the beacon sweep period. The beacon may contain a duration field that may be set to the time remaining until the end of the beacon transmission interval (BTI). For example, each beacon may indicate the end time of the BTI period, the duration of the BTI, the duration of any separation period after the BTI period and before the start of the first A-BFT period, the start time of a first A-BFT period, and/or the start time of any later A-BFT period(s). In some embodiments, the duration field may indicate (e.g., point to) the end of the beacon sweep period, including beacon sweep period of the same and other antenna arrays, e.g., the duration field may indicate the end of the beacon sweep period of the last antenna array. In some embodiments, the indicated time for the end of the BTI (e.g., or the duration of the BTI which may be indicated in one or more fields of the beacon) may be adjusted to signal the start of the response period for the respective antenna array (e.g., or for any particular antenna array). In other words, the indication of the end of the BTI may change for different groups of beacons from different antenna arrays, thus configuring STAs receiving these beacons to respond following the end of the BTI. For example, an AP 102 with two antenna arrays may transmit beacons using a first array that indicate that the BTI ends at a time 1, such that time 1 follows transmission of beacons using a second array (thus configuring STAs receiving the beacons from the first array to respond during a first A-BFT starting at time 1), and may transmit beacons using the second array that indicate that the BTI ends at a time 2, such that time 2 follows the first A-BFT (thus configuring STAs receiving the beacons from the second array to respond during a second A-BFT starting at time 2, after the first A-BFT). Such an approach may be extended to any number of arrays and response periods. In some embodiments, the starting time of the A-BFT from the received beacon may correspond to the exact (e.g., or approximate) time that the AP/PCP has its antenna array pointing to the station that received the beacon. The order of response periods corresponding to antenna arrays can be configured as desired. In some embodiments, the order of the response periods corresponding to different antenna arrays may be configured to reduce antenna switching.

As a further example of configuration information, the correspondence between each A-BFT period and the corresponding antenna array (e.g., and/or receive sector/beam) used by the AP 102 may be indicated in any manner desired. In some embodiments, the signaling may be done by using one or more existing reserve field(s) in the beacon interval control of the beacon. Some bits of a reserve field may be used to indicate that multiple antenna arrays are used for beacons and that multiple corresponding response periods are configured. In some embodiments, an A-BFT multiplier subfield of the beacon control interval (e.g., as included in 802.11 ay) may be used to indicate the number of A-BFT periods before the A-BFT period with the corresponding antenna array (e.g., and/or receive sector/beam), and may thus indicate the start time of the A-BFT period that a STA 106 should use to respond to the corresponding beacon. In some embodiments, the beacon may include cluster information (e.g., corresponding to the stations in specific directions, e.g., corresponding to an antenna array). The cluster information field may be used to signal the properties of stations that can associate with the AP. When beacons broadcast with different antenna arrays specify different properties, stations with the specified properties may respond in the specific A-BFT slots. Still further, the configuration information may include any information about motion of the AP 102 or other factors that may impact beamforming.

STA 106 may receive one or more of the beacons transmitted in 502 by the AP 102. The STA 106 may take various measurements (e.g., of signal to noise ratio (SNR), received signal strength indicator (RSSI), etc.) for any received beacon in order to determine channel characteristics of the beacon. Thus, any STA 106 that received at least one beacon may determine information including the antenna array, antenna ID, sector ID, and channel characteristics of each received beacon, as well as configuration information related to the response period(s). For example, STA 106 may determine which particular antenna array (e.g., of a plurality of antenna arrays of the AP 102) was used to transmit a beacon, and may further determine the channel characteristics and response period associated with the beacon.

Following transmission of the last beacon, the AP 102 and STA 106 may wait for a separation period. The separation period may be a medium beam-forming inter-frame space (MBIFS) (e.g., as defined in 802.11 ad), although other period lengths are envisioned.

Based on the beacon(s) received, the STA 106 may determine a response period (504). The response period may be an A-BFT. The STA 106 may select a response period based on the information included in the received beacon(s) and/or measurement(s) of the beacon(s). In some embodiments, if the STA 106 received multiple beacons, it may select a response period associated with (e.g., corresponding to) the antenna array (e.g., or possibly sector/beam) of the beacon with the best measured channel characteristics (e.g., highest SNR and/or RSSI, among other possibilities, e.g., based on the measurement(s)). If the STA 106 received a single beacon, it may determine a response period associated with the AP 102 antenna array (e.g., or possibly sector/beam) transmitting that beacon. More generally, STA 106 may determine a response period based on the information about when the AP 102 will receive using the antenna array (e.g., and/or receive beam/sector) corresponding to the beacon received by STA 106 (e.g., or the received beacon with the best channel characteristics). In other words, the response period may be an A-BFT corresponding to an antenna array of the AP 102 corresponding to a best channel between STA 106 and the AP 102. In some embodiments, rather than selecting one of the beacons, the STA 106 may choose to respond to only the first received beacon. In other embodiments, the station may choose to respond to only to the last received beacon. In some embodiments, the station may choose to respond to the first or last received beacon with certain (e.g., acceptable) performance characteristics (e.g., based on comparing one or more measurements to one or more thresholds).

STA 106 may also determine how and when (e.g., within the response period) to respond to the beacon. For example, STA 106 may select an SSW slot of an A-BFT period according to any method desired (e.g., randomly, pseudo-randomly, or as specified in an 802.11 standard). The response may be or include a request to join a network 100 provided by AP 102. STA 106 may further implement a contention process, such as a backoff timer, to reduce the probability of collisions with responses from other devices. For example, STA 106 may implement Distributed Coordination Function (DCF), among other possibilities.

STA 106 may format the response in any manner desired, e.g., as specified by an 802.11 standard. For example, the response may include any fields specified by such a standard and/or other information. In some embodiments, the response may provide/include information useable by the AP 102 for beamforming (e.g., responder transmitter sector sweep or R-TXSS). For example, the response may indicate the antenna array, beam, or sector used by STA 106 and/or may indicate the measurements of channel characteristics that STA 106 has measured. Further, the response may indicate the transmit power used by STA 106.

STA 106 may transmit the response to the AP 102 (506). STA 106 may transmit the response in the time and manner determined. For example, STA 106 may use time and frequency resources (e.g., within the determined/selected response period) to transmit the response as specified in the beacon and/or based on specifications of a WLAN standard. AP 102 may measure channel characteristics (e.g., SNR, SINR, RSSI, etc.) of the response.

Based on receiving the response from STA 106, AP 102 may transmit feedback (508). The feedback may indicate that STA 106 is permitted to join the network. The feedback may be sector sweep (SSW) feedback. The feedback may provide beam forming information, including channel characteristics, antenna patterns/sectors, etc. The feedback may be transmitted during or subsequent to the response period, e.g., within a specific SWW slot of the A-BFT.

Following the transmission of the feedback, STA 106 and AP 102 (e.g., and possibly additional devices on the network) may exchange data as desired. For example, a data transmission interval (DTI) may follow the A-BFT.

Figure 6:
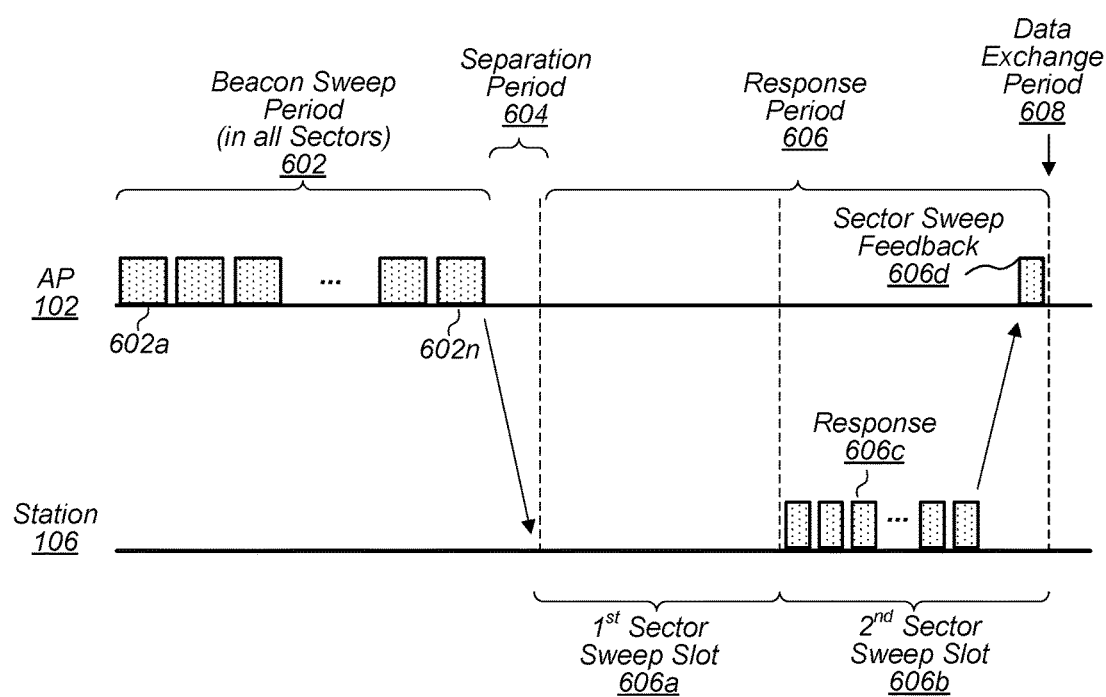
FIG. 6 is a timing diagram illustrating beacon transmission by an access point (AP) using a single antenna array and response by a station, according to some embodiments.

FIG. 6—Beacon Transmission Using a Single Antenna Array and Response

FIG. 6 illustrates beacon transmission by an access point/PCP 102 using a single antenna array and response by a station 106.

During beacon sweep period 602 (e.g., BTI) AP 102 transmits a series of beacons. For example, as illustrated, AP 102 may transmit beacons 602a-602n. One (or possibly more) beacon may be transmitted using each beam/sector/antenna pattern of the antenna array of AP 102. Thus, in combination, the beacons may be directed in all directions reachable by the antennas of AP 102. The beacons may include various types of information in any combination of fields desired. The beacons may be formatted in any manner desired. For example, the beacons may be structured according to various standards (e.g., IEEE 802.11ad/ay). STA 106 may receive and decode one or more of the beacons, and may take measurements (e.g., signal strength, quality, etc.) of the received beacon(s).

The AP 102 and STA 106 may wait for a separation period (604). The separation period may be a medium beamforming inter-frame space (MBIFS), although other period lengths are possible.

The response period (606), may be an association beamforming time (A-BFT). The response period may consist of one or more sector sweep (SSW) slots. e.g., $1^{st}$ and second sector sweep slots (606a and 606b). A STA 106 may respond during one of the slots (e.g., as illustrated in sector sweep slot 606b) in order to synchronize with and join the network 100. The STA 106 may randomly select which of the slots to contend for access to the network. The number of slots may be configurable as desired.

During the response period, the AP 102 may receive using the antenna pattern (e.g., and/or antenna array) indicated in the beacon(s). For example, standards such as 802.11 ad may specify that the AP 102 receive in a quasi-omni antenna pattern using the same DMG antenna indicated in a DMG Antenna ID subfield of the beacon.

A STA 106 contending (e.g., for access to the network of AP 102 by responding to the beacons 602) during a slot may send a response (606c) which may be a short packet (e.g., a sector-sweep or SSW frame) response back to the AP 102, in response to the beacon. In some embodiments, the STA 106 may use a back-off counter (e.g., timer) to determine when to transmit the short packet (e.g., at what time during the SSW slot, e.g., 606b). The duration of the SSW frame may be about 9 or 15 μs, (e.g., as in IEEE 802.11 ad/ay) among other possibilities. The short packet may be structured as desired. The duration of the short packet may depend on the fields included. The short packet may include information identifying STA 106 and information useable for beamforming. In some embodiments, STA 106 may transmit the response multiple times. For example, the STA 106 may sequentially transmit the short packet using each sector/beam of its antennas (e.g., it may transmit the response once in each direction reachable by its antennas). In some embodiments, STA 106 may transmit a plurality of short packets.

In response to receiving the short packet(s), AP 102 may transmit SSW feedback (606d). The SSW feedback may indicate that STA 106 is tentatively admitted to the network and may include beamforming information. The SSW feedback may further include scheduling information, e.g., identifying time and/or frequency resources for future data exchanges between AP 102 and STA 106.

During a data exchange period (e.g., starting at 608), STA 106 and AP 102 may exchange data, e.g., related to any applications executing on STA 106. The data exchange may include uplink and/or downlink transmissions. The data exchange period may be a data transmission interval (DTI) e.g., as in 802.11 standards. Any number of data exchange periods may occur. The duration of the data exchange period may be configured as desired. Parameters of the data exchange period (e.g., duration, resources, etc.) may include in the SSW feedback and/or may be negotiated at other times (e.g., during or before the data exchange period).

Figure 7:
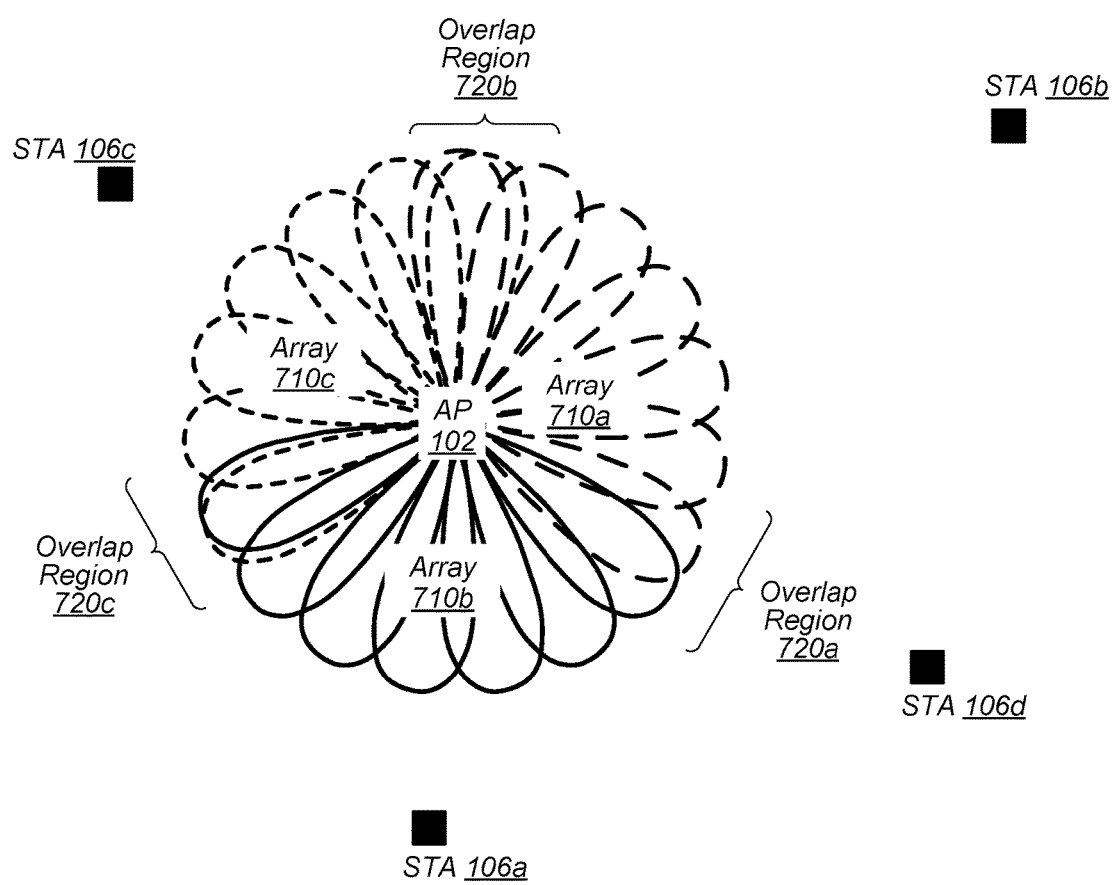
FIG. 7 illustrates the use of multiple antenna arrays by an access point (AP) in communication with multiple stations, according to some embodiments.

FIG. 7—Multiple Antenna Arrays

FIG. 7 illustrates an AP 102 using antenna arrays 710a-c to exchange data with STAs 106a-d. In combination, the antenna arrays 710a-c may be configured to cover some or all angles/directions. The directions covered by the antenna arrays may be configured as desired. Different numbers of antenna arrays may be used. AP 102 may rotate (e.g., sequentially) through the antenna arrays 710a-c transmitting beacons and the beacons may describe (e.g., indirectly) the rotation of the antenna arrays during one or more corresponding response period. Note that the term rotation is used to describe sequential use (e.g., or more generally, the order and timing of use) of the antenna arrays. Physical rotation (or other motion) of the antenna arrays may or may not occur.

Each of antenna arrays 710a-c has seven beams/sectors/antenna patterns that can be used to exchange transmissions with one or more stations (e.g., STA 106). For example, STA 106a may be in the coverage region of array 710b (e.g., may be in the cluster of 710b). AP 102 may use a beamforming process to select the specific beam to use for each STA with which it communicates. AP 102 may update the selection (e.g., the selected beam for a STA) periodically/continually as conditions and locations of the devices change. For example, AP 102 may initially select one of the beams/sectors of array 710b for communication with STA 106a, and may select a second beam/sector in response to changes (e.g., in channel conditions and/or device locations). The second beam/sector may or may not also be one of the beams/sectors of array 710b, e.g., the second beam/sector could be one of array 710a or 710b. Different numbers of beams/sectors may be used.

In some embodiments, there is an overlap region wherein beams of one antenna array reach the same or similar regions as the beams of another antenna array. As illustrated, overlap region 720a is covered by beams of arrays 710a and 710b. For example, STA 106d may be in the overlap region 720a and may reachable by beams of arrays 710a and 710b (e.g., STA 106d may be included in clusters associated with both arrays 710a and 710b). Thus, STA 106d may use a response period associated with either array 710a or 710b, e.g., based on channel characteristic measurements, order of beacons received, etc. Similarly, overlap region 720b is covered by beams of arrays 710a and 710c and overlap region 720c is covered by beams of arrays 710b and 710c. In some embodiments, there may be no overlap region between antenna arrays.

It will be appreciated that the illustrated example is exemplary only, and that other numbers/arrangements of stations, antenna arrays and beams/sectors/antenna patters for each array are possible. Although the illustrated example is two-dimensional, it will be appreciated that three-dimensional embodiments are included within the scope of this application. For example, antenna arrays providing coverage to stations in three dimensions are envisioned and the methods, processes, devices, and apparatuses disclosed herein may be applied to wireless networks operating in three-dimensions.

Figure 8:
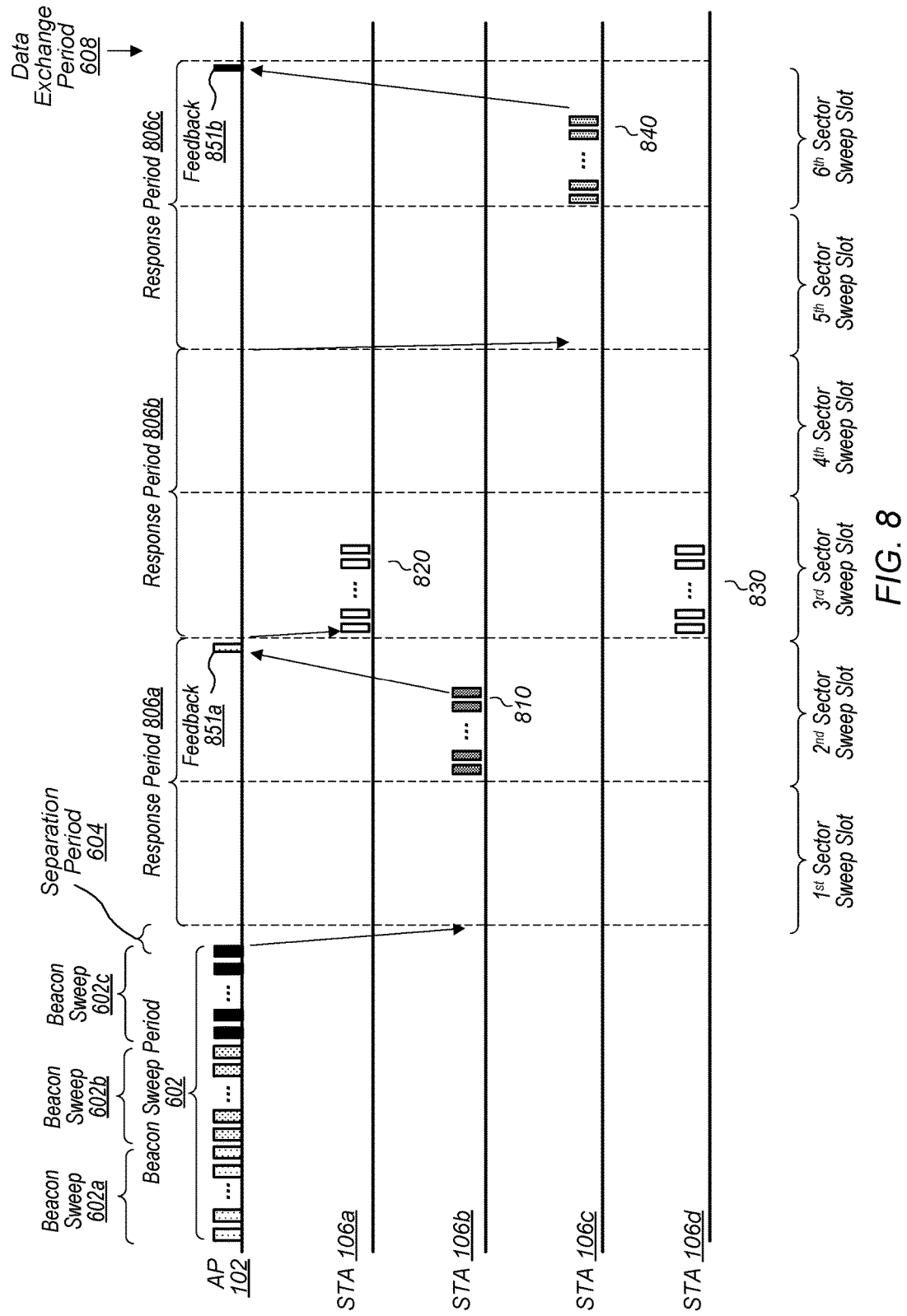
FIG. 8 is a timing diagram illustrating beacon transmission by an access point (AP) using multiple antenna arrays and response of multiple stations, according to some embodiments.

FIG. 8—Beacon Transmission and Response Using Multiple Antenna Arrays

FIG. 8 illustrates beacon transmission by an access point/PCP 102 using three antenna arrays and response by four stations (106a-d). FIG. 8 corresponds to the geometry of FIG. 7, as explained below.

AP 102 may sequentially perform beacon sweeps (602a-c) using each of its antenna arrays. During beacon sweep 602a, AP 102 may transmit beacons using (e.g., all) sectors/beams of antenna array 710a in sequence. Similarly, during sweeps 602b and 602c, AP/PCP may use arrays 710b and 710c to transmit beacons. Among other included information, the beacons may indicate which antenna array corresponds to the respective beacon. Further, the beacons may indicate the timing of a response period for each antenna array. For example, in the illustrated example, an A-BFT multiplier field may range from "0" (for beacons of beacon sweep 602a) to "2" (for 602c) to indicate the number of previous response periods before a response period with the same antenna array as the respective beacons. In some embodiments, the timing of the response period may not be included in the beacons, and may instead be transmitted separately (e.g., following the beacons, among other possibilities).

The AP 102 may wait for a separation period (604).

There may be one or more response period (806) for each antenna array of AP 102. In some embodiments, each response period may be an A-BFT and may include one or more slots (e.g., SSW slots). As illustrated, response period 806a may correspond to antenna array 710a, response period 806b may correspond to antenna array 710b, and response period 806c may correspond to antenna array 710c. Each response period 806 may consist of one or more slots, e.g., in the illustrated embodiment each response period 806 may consist of two SSW slots.

Each STA 106 may determine a response period based at least in part on the beacon(s) received during beacon sweeps 602. For example, STA 106 may use any configuration information included in the beacon(s) and/or measurements of channel characteristics of the beacon(s). This determination may occur at any time, e.g., during beacon sweeps 602, during separation period 604, and/or during response period 806.

STA 106b (referring back to FIG. 7, note that STA 106b is in a direction corresponding to array 710a) may determine response period 806a, may randomly select to respond during the second slot of response period 806a, and may transmit a response (e.g., a short packet 810) during that time. The short packet 810 may be an SSW frame and may include any information/fields/format desired. The short packet 810 may be transmitted multiple times, e.g., as illustrated. Based on receiving the short packet 810, AP 102 may transmit sector sweep feedback 851a, e.g., within the same period and/or slot as receiving the transmission from the STA.

STA 106b and STA 106d (referring back to FIG. 7, note that STAs 106a and 106d may be in a direction corresponding to array 710b) may both (e.g., each, independently) determine to respond during response period 806b. STA 106b and STA 106d may both (e.g., each, independently) randomly select to respond during the first slot of 806b (e.g., the $3^{rd}$ sector sweep slot), and may each attempt to transmit a response (e.g., a short packet) during that time. Due to the collision of their responses (e.g., 820 and 830), the AP 102 may not decode either of the responses. Therefore, AP 102 may not send feedback to either of STA 106a and 106d. STA 106a and 106d may determine that the medium is not clear, and may backoff until a later response period (e.g., an A-BFT after another beacon sweep).

During response period 806c, STA 106c may transmit a response 840. The AP 102 may transmit feedback 851b to STA 106c.

The AP 102 may exchange data with STAs 106a-d during a data exchange period, e.g., beginning at 608.

Figure 9:
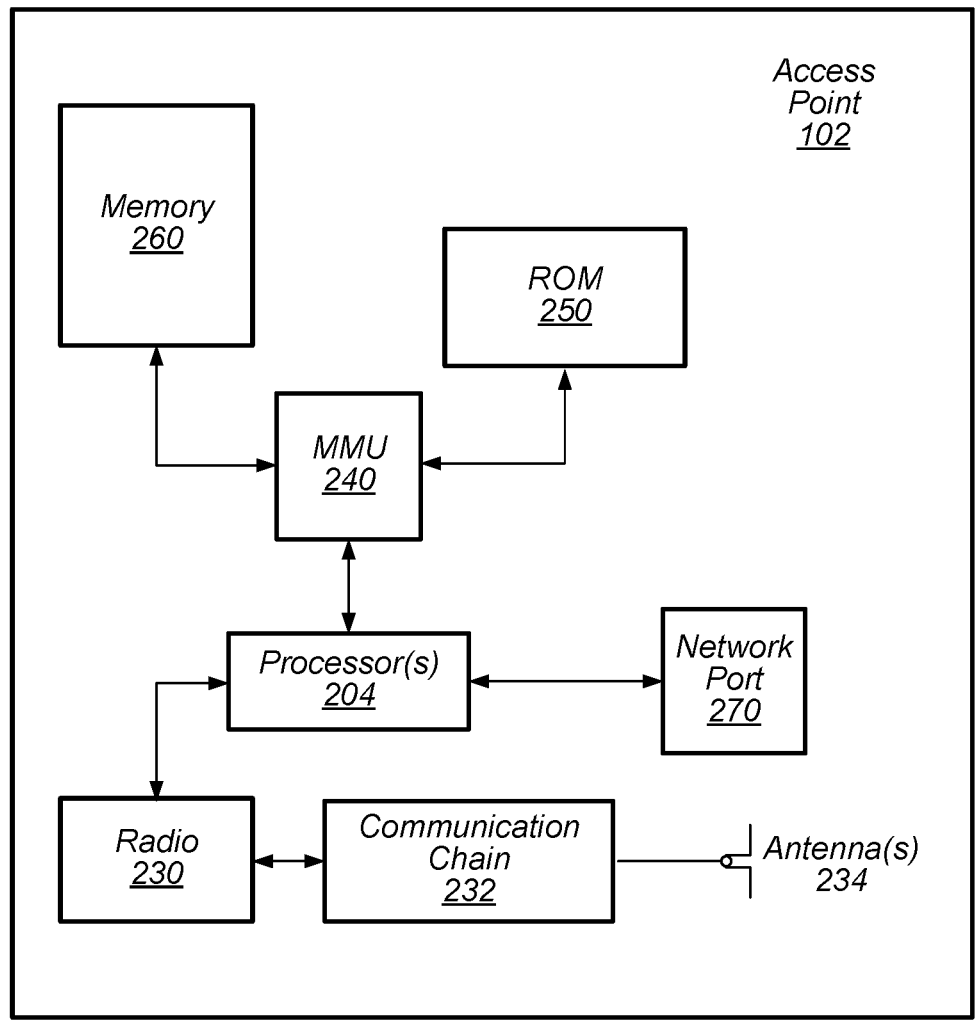
FIG. 9 illustrates an exemplary simplified block diagram of an Access Point (AP), according to some embodiments While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

FIG. 9—Access Point Block Diagram

FIG. 9 illustrates an example block diagram of an access point (AP) 102. It is noted that the block diagram of the AP of FIG. 9 is only one example of a possible system. As shown, the AP 102 may include processor(s) 204 which may execute program instructions for the AP 102. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 102 may include at least one network port 270. The network port 270 may be configured to couple to a wired network and provide a plurality of devices, such as wireless devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 102 may include at least one antenna 234, which may be configured to operate as a wireless transceiver and may be further configured to communicate with wireless device 106 via wireless communication circuitry 230. The antenna(s) 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 102 to communicate via various different wireless communication technologies.

The AP 102 may be configured to act as an access point to provide an infrastructure mode 802.11 network to wireless stations in the vicinity of the AP 102. Additionally or alternatively, the AP 102 may be configured to act as a peer station to perform peer-to-peer communications with nearby wireless stations. In some embodiments, as further described below, AP 102 may be configured to perform methods for using cancelable and non-cancelable further availability windows in conjunction with NAN communication, for example when communicating with one or more other wireless stations as a peer.

In the following, exemplary embodiments are provided.

In at least one set of embodiments a method for operating a wireless station may comprise: receiving at least one beacon from an access point, wherein each beacon of the at least one beacon indicates an antenna array used by the access point to transmit the beacon; determining a response period, wherein said determining the response period is based at least in part on the antenna array used to transmit at least one of the at least one beacon; and transmitting a response to the access point.

In some embodiments, the method may further comprise: taking at least one measurement of channel characteristics of the at least one beacon, wherein the determination of the response period is further based at least in part on the at least one measurement.

In some embodiments, the response period may correspond to the antenna array used by the access point to transmit the beacon with the best channel characteristics.

In some embodiments, the response period may correspond to a first beacon received of the at least one beacon.

In some embodiments, the response period may correspond to a last beacon received of the at least one beacon.

In some embodiments, the response period may comprise information useable by the access point for beamforming.

In some embodiments, the response may comprise a request to join a wireless local area network provided by the access point.

In another set of embodiments, a method for operating an access point may comprise: providing a wireless network; and sequentially, for each respective antenna array of a plurality of antenna arrays: during a beacon sweep period, transmitting at least one beacon using the respective antenna array, wherein each beacon indicates an identity of the respective antenna array; and receiving, using the respective antenna array, during at least one respective response period associated with the respective antenna array.

In some embodiments, transmitting at least one beacon using the respective antenna array may comprise transmitting beacons in each direction reachable by the respective antenna array.

In some embodiments, each beacon may further indicate an antenna pattern of the antenna array used to transmit the beacon.

In some embodiments, the wireless network may be a wireless local area network, wherein the beacon sweep period may be a beacon transmission interval, and wherein the at least one respective response period may be an association beamforming training period.

In some embodiments, the method may further comprise: receiving a response, wherein the response is from a first station; and transmitting feedback to the first station, wherein the feedback is based on the response.

In some embodiments, the feedback may comprise beamforming information, and the method further may comprise exchanging data with the first station over the wireless network.

In some embodiments, the method may further comprise: indicating a time of the at least one respective response period associated with each respective antenna array.

In some embodiments, each beacon may indicate the time of the respective response period.

In some embodiments, the time of the respective response period may be indicated by a duration of the beacon sweep period.

In some embodiments, an association beamforming training multiplier subfield may indicate the time of the respective response period.

In another set of embodiments, an apparatus may comprise: one or more processing elements, wherein the one or more processing elements are configured to cause an access point to: rotate through a plurality of antenna arrays; transmit a plurality of beacons, wherein respective subsets of the plurality of beacons are transmitted using each respective antenna array of the plurality of antenna arrays; and receive one or more responses from one or more wireless devices during a plurality of response periods, wherein each respective antenna array of the plurality of antenna arrays is used for reception of a respective subset of the plurality of response periods.

In some embodiments, each respective subset of the plurality of beacons may indicate the rotation of the antenna arrays, wherein the indication comprises a beacon interval control field.

In some embodiments, the processing element may be further configured to cause the access point to: measure channel characteristics of any response received from a station during the plurality of response periods; and transmit feedback to the station, wherein the feedback provides beamforming information.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a STA 106, an AP 102, etc.) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for operating a wireless station, the apparatus comprising:
one or more processing elements, wherein the one or more processing elements are configured to cause the wireless station to:
receive at least one beacon from an access point, wherein each respective beacon of the at least one beacon indicates a duration of a beacon sweep period and a respective antenna array used by the access point to transmit the respective beacon, wherein each respective antenna array is one of a plurality of antenna arrays of the access point;
determine an identity of a particular antenna array used by the access point to transmit at least one of the at least one beacon;
determine a response period, wherein said determining the response period is based at least in part on the duration of the beacon sweep period and the identity of the particular antenna array; and
transmit a response to the access point, wherein the response is transmitted during the response period.

2. The apparatus of claim 1, wherein the one or more processing elements are further configured to cause the wireless station to,
take at least one measurement of channel characteristics of the at least one beacon, wherein the determination of the response period is further based at least in part on the at least one measurement.

3. The apparatus of claim 2, wherein the at least one measurement indicates that the particular antenna array is associated with best channel characteristics of the at least one beacon.

4. The apparatus of claim 1, wherein the response comprises information useable by the access point for beamforming.

5. The apparatus of claim 1, wherein the response comprises a request to join a wireless local area network provided by the access point.

6. A method for operating an access point, comprising:
providing a wireless network; and
sequentially, for each respective antenna array of a plurality of antenna arrays:
during a beacon sweep period, transmitting at least one beacon using the respective antenna array, wherein each beacon indicates an identity of the respective antenna array;
indicating a time of at least one respective response period associated with the respective antenna array using a duration of the beacon sweep period; and
receiving, using the respective antenna array, during the at least one respective response period associated with the respective antenna array.

7. The method of claim 6, wherein transmitting at least one beacon using the respective antenna array comprises transmitting beacons in each direction reachable by the respective antenna array.

8. The method of claim 6, wherein each beacon further indicates an antenna pattern of the antenna array used to transmit the beacon.

9. The method of claim 6,
wherein the wireless network is a wireless local area network,
wherein the beacon sweep period is a beacon transmission interval, and
wherein the at least one respective response period is an association beamforming training period.

10. The method of claim 6, further comprising:
receiving a response, wherein the response is from a first station; and
transmitting feedback to the first station, wherein the feedback is based on the response.

11. The method of claim 10,
wherein the feedback comprises beamforming information, and
wherein the method further comprises exchanging data with the first station over the wireless network.

12. The method of claim 6, wherein an association beamforming training multiplier subfield indicates the time of the respective response period.

13. An apparatus comprising:
one or more processing elements, wherein the one or more processing elements are configured to cause an access point to:
transmit a plurality of beacons using a plurality of antenna arrays, wherein respective subsets of the plurality of beacons are transmitted sequentially using each respective antenna array of the plurality of antenna arrays;
indicate respective response periods of a plurality of response periods associated with each respective antenna array;
indicate the association between each respective antenna array and each respective response period; and
receive one or more responses from one or more wireless devices during the plurality of response periods, wherein each respective antenna array of the plurality of antenna arrays is used for reception of a respective subset of the plurality of response periods.

14. The apparatus of claim 13, wherein the association between each respective antenna array and each respective response period is indicated by a beacon interval control field.

15. The apparatus of claim 13, wherein the processing element is further configured to cause the access point to:
measure channel characteristics of any response received from a station during the plurality of response periods; and
transmit feedback to the station, wherein the feedback provides beamforming information, wherein the beamforming information is based at least in part on the measured channel characteristics.

16. The apparatus of claim 13, wherein the respective response periods of the plurality of response periods associated with each respective antenna array are indicated using an association beamforming training multiplier subfield.

17. The apparatus of claim 13, wherein the one or more responses includes information useable for beamforming, wherein the information includes an indication of a transmit power of a wireless device of the one or more wireless devices.

18. The apparatus of claim 13, wherein indicating the association between each respective antenna array and each respective response period includes indicating different respective durations in different respective beacons of the plurality of beacons.

19. The apparatus of claim 1, wherein an association beamforming training multiplier subfield of the at least one beacon in combination with the duration of the beacon sweep period and the identity of the particular antenna array indicates a time of the respective response period.

20. The apparatus of claim 1, wherein the duration is adjusted to signal a start of a response period corresponding to the particular antenna array.

\* \* \* \* \*